United States Patent [19]

Emmons et al.

[11] 4,100,133

[45] Jul. 11, 1978

[54] AIR-DRY CURABLE COMPOSITIONS COMPRISING DICYCLOPENTENYL (METH) ACRYLATE COPOLYMERS AND NON-VOLATILE REACTIVE MONOMER, AND CURED COATINGS AND IMPREGNATIONS OBTAINED THEREFROM

[75] Inventors: William D. Emmons, Huntingdon Valley; Peter R. Sperry, Doylestown; Kayson Nyi, Sellersville, all of Pa.

[73] Assignee: Rohm and Haas Company, Philadelphia, Pa.

[21] Appl. No.: 802,087

[22] Filed: May 31, 1977

Related U.S. Application Data

[63] Continuation-in-part of Ser. No. 699,726, Jun. 24, 1976.

[51] Int. Cl.² .................... C08K 5/33; C08L 31/02
[52] U.S. Cl. .................... 260/45.9 L; 260/884; 260/885; 427/385 R; 428/522
[58] Field of Search .................... 260/885, 45.9 L, 884

[56] References Cited

U.S. PATENT DOCUMENTS

| | | | |
|---|---|---|---|
| 2,414,089 | 1/1947 | Bruson | 260/410.5 |
| 2,462,400 | 2/1949 | Hoover | 526/283 |
| 2,601,273 | 6/1952 | Gerhart | 260/23.5 |
| 3,322,732 | 5/1967 | Tsuruta et al. | 260/78.5 |
| 3,448,066 | 6/1969 | Parker | 260/20 X |
| 3,497,571 | 2/1970 | Tellier et al. | 260/844 |
| 3,642,750 | 2/1972 | Wegemund et al. | 260/885 X |
| 3,772,062 | 11/1972 | Shur et al. | 260/885 X |
| 3,984,385 | 10/1976 | Gruber et al. | 260/885 X |

*Primary Examiner*—Murray Tillman
*Assistant Examiner*—Thurman K. Page

[57] ABSTRACT

This invention is concerned with coating and/or impregnating compositions comprising (a) A copolymer of 5 to 50% by weight of dicyclopentenyl acrylate or methacrylate with 50 to 95% by weight of at least one other monoethylenically unsaturated comonomer.

(b) An essentially non-volatile reactive comonomer consisting of dicyclopentenyl acrylate or methacrylate or a mixture thereof, or comprising a mixture of at least 50% by weight of one or both of these monomers with up to 50% by weight of at least one other reactive monomer, such as a $(C_{10}-C_{20})$alkyl acrylate or methacrylate, a $(C_{10}-C_{20})$alkenyl acrylate or methacrylate, a di($C_4-C_{20}$)-alkyl fumarate, maleate, or itaconate, or a polyethylenically unsaturated monomer, such as a polyol polymethacrylate, e.g. glycol dimethacrylate, or the analogous diacrylate, or mixtures of two or more such monomers.

(c) A polyvalent metal-containing complex or salt that catalyzes the oxidative curing of a) and b), such as cobalt naphthenate, and (d) A volatile oxime stabilizer.

Such compositions are characterized by the fact that they can have exceptionally high solids content and rapid cure by air-drying to exceptional properties of hardness and resistance to solvents even without baking.

12 Claims, No Drawings

AIR-DRY CURABLE COMPOSITIONS COMPRISING DICYCLOPENTENYL (METH) ACRYLATE COPOLYMERS AND NON-VOLATILE REACTIVE MONOMER, AND CURED COATINGS AND IMPREGNATIONS OBTAINED THEREFROM

This is a continuation-in-part of U.S. Ser. No. 699,726, filed Jun. 24, 1976.

BACKGROUND OF THE INVENTION

Bruson U.S. Pat. No. 2,414,089, Jan. 14, 1947, discloses the preparation of esters of hydroxydicyclopentadiene with unsaturated monocarboxylic acids including acrylic acid (Ex. 9), methacrylic acid (Ex. 8), and numerous other unsaturated acids mentioned in the passage of column 3, line 67 to column 4, line 24. Use of the esters as vehicles for paints, varnishes and similar coating materials is mentioned in column 4, lines 25 to 27, and in the passage of lines 62 to 75 of column 6, the linoleate (of Ex. 3) is used with a drier to form a film that is baked to form a varnish-like coating, and other unsaturated higher fatty acids are suggested for this use. The passage in lines 49 to 53 of column 4 states that the new esters may be mixed with drying oils, alkyd resins, hydrocarbons, such as rubber or cyclized rubber, and other oils and resins.

P. D. Bartlett and Abraham Schneider, J.A.C.S. 68, 6 (1946) give the correct structure of the esters produced by Bruson, which he had erroneously named as a result of his theory as to rearrangement.

Hoover U.S. Pat. No. 2,462,400, Feb. 22, 1949, discloses the preparation of copolymers of 20 to 50% by weight of dihydrodicyclopentadienyl methacrylate with saturated ($C_8$–$C_{18}$)aliphatic monohydric alcohol esters of methacrylic acid using an organic peroxide initiator. A solution of the copolymer containing a drier is then used for coating substrates, the coating being air-dried. This patent concerns solution polymers having high molecular weight which require dilution with organic solvent to a relatively low solids content to avoid excessive viscosity during application. These compositions are generally slow in curing by air-drying with a siccative and to attain a tight cure, a baking step at 100° C or more is required.

Wegemund et al., U.S. Pat. No. 3,642,750, Feb. 15, 1972, discloses the production of adhesive compositions comprising liquid monomeric (meth)acrylic acid esters of an alcohol derived from a cyclopentadiene, with or without other monomers, and an organic peroxide or an organic hydroperoxide; these adhesives are anaerobic in that they harden under exclusion of oxygen.

For simplicity, DCPA hereinafter refers specifically to dicyclopentenyl acrylate, DCPMA refers specifically to dicyclopentenyl methacrylate, and DCP(M)A refers generically to these two monomers and also to mixtures thereof.

In accordance with the present invention, it has been discovered that the addition of an essentially nonvolatile ethylenically unsaturated reactive monomer, at least 50% by weight of which is DCP(M)A, i.e., dicyclopentenyl acrylate or methacrylate or a mixture of these monomers, to a coating composition comprising, dispersed therein, a copolymer containing copolymerized therein as little as 5% by weight of dicyclopentenyl acrylate or methacrylate or of a mixture thereof (or as much as about 50% by weight thereof, but preferably in the range of about 10 to 40% by weight thereof), an effective amount of a polyvalent metal-containing complex or salt that catalyzes the oxidative curing of the reactive monomer and the copolymer, and a volatile oxime stabilizer provides a coating and/or impregnating composition that can be stored for months in closed containers without hardening or setting; nevertheless, when the compositions are used for coating and/or impregnating substrates exposed to air in the normal fashion, the films are cured rapidly by autoxidation, no precaution need be taken to exclude air since the compositions of the present invention depend on the presence of the oxygen of the ambient air to cure; furthermore, the initial content of DCP(M)A in the copolymer of the composition in conjunction with the non-volatile reactive monomer, at least 50% by weight of which is DCP(M)A, i.e. dicyclopentenyl acrylate or methacrylate, or a mixture thereof, enhances the rapidity of cure by air-drying, provides greatly improved properties, e.g. hardness, toughness, and solvent-resistance, in the finally cured coatings and/or impregnations, and also enables the use of high solids for coating purposes without the drawback of excessive viscosity at the time of application. The amount of non-volatile reactive monomer added may be from about 3 to 50% by weight, based on the total weight of the DCP(M)A copolymer and reactive monomer in the composition.

By the term "non-volatile" or "essentially non-volatile" as applied to the reactive monomer(s), it is intended herein that the reactive monomer or mixture thereof must have a vapor pressure/reactivity balance under the conditions of cure, ambient or force-dry, such that no more than 5 weight % of reactive monomer is lost by evaporation during curing of the film coatings formed from the compositions of the present invention.

For the sake of simplicity and clarity, the copolymers of the present invention may, as previously stated, comprise 5 to 50% by weight, preferably 10 to 40% by weight, of a monomeric component consisting of dicyclopentenyl acrylate or dicyclopentenyl methacrylate or mixtures of both. Similarly, the non-volatile reactive monomer added to the coating composition containing the DCP(M)A copolymer may consist of DCPA or DCPMA or a mixture thereof generically represented by DCP(M)A.

The acrylic ester of the dicyclopentadiene is believed to have the following formula:

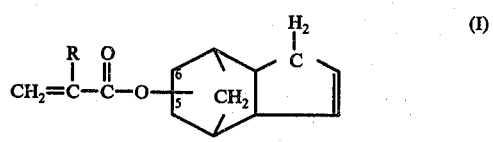

wherein R is H or $CH_3$. The (meth)acryloxy substituent may be on either the 5 or 6 position, the commercial product being a mixture of the two isomers.

The DCP(M)A is a reactive high-boiling liquid acrylic ester monomer or monomer mixture which has been found to have an unusual combination of desirable characteristics for use in coatings: low viscosity, volatility, and toxicity; the volatility being so low that it is essentially non-volatile and meets the criterion for non-volatility set forth hereinabove; hydrophobicity and outstanding hydrolytic stability even under acid or alkaline conditions; an outstanding compatibility with a wide range of polymeric and/or resin-forming condensates so that it can be used with or without a small amount of another solvent to form a solution of the DCP(M)A copolymer required in the present invention, optionally with another polymer and/or resin-forming condensate, which can be applied as a coating to any substrate; a reactivity with the DCP(M)A copolymer, optionally in conjunction with other non-volatile polymeric and/or resin-forming materials, in the presence of a metal-containing complex or salt whereby the exposure of a coating containing the reactive monomer, the DCP(M)A copolymer (optionally also another polymer and/or condensate), and a polyvalent metal-containing complex or salt with or without other solid ingredients, e.g., pigments, fillers, plasticizers, dyes, etc. to normal atmospheric conditions results in the production of solid films having a desirable combination of characteristics. In the case of 100% solids compositions containing no solvent other than the non-volatile reactive monomer solvent, air-drying to solid state is accomplished without the necessity of volatilizing any solvent material, thereby reducing air pollution and wastage.

Instead of adding DCP(M)A as the entire non-volatile reactive monomer, there may be added a mixture of at least 50 weight % of DCP(M)A and, the balance to make a total of 100 weight %, of at least one non-volatile di-($C_4$–$C_{20}$)alkyl fumarate, maleate, or itaconate, or a nonvolatile ($C_{10}$–$C_{20}$)aliphatic alcohol ester of acrylic acid or methacrylic acid which ester may be particularly valuable in compensating for excessive hardness that might result from the use of a copolymer having a high proportion, e.g. from 25 to 50% by weight, of DCP(M)A in the copolymer. If desired the reactive monomer may be a mixture of the DCP(M)A with a di-($C_4$–$C_{20}$)alkyl ester and with an acrylate or methacrylate of a ($C_{10}$–$C_{20}$) aliphatic alcohol. Examples of the latter acrylates and methacrylates include decyl acrylate, isodecyl acrylate, undecyl acrylate, lauryl acrylate, cetyl acrylate, pentadecyl acrylate, hexadecyl acrylate and octadecyl acrylate, as well as the corresponding methacrylates and the unsaturated analogues such as oleyl acrylate or methacrylate, linoleyl (meth)acrylate, linolenyl (meth)acrylate, etc. Examples of the dialkyl esters include dibutyl fumarate, dibutyl maleate, dibutyl itaconate, dihexyl fumarate, di(dodecyl) maleate, distearyl fumarate, etc.

Another type of essentially non-volatile reactive monomer that may be used in admixture with DCP(M)A is the polyfunctional type, i.e. a polyethylenically unsaturated monomer of such low volatility as to meet the non-volatile criterion set out hereinabove for reactive monomers, and having at least two terminal unsaturated groups of the formula $H_2C\!=\!C\!<$. Examples of this type of reactive monomer include ($C_2$–$C_6$)glycol or ($C_2$–$C_6$)polyol polyacrylates or polymethacrylates, e.g. ethylene glycol di(meth)acrylate, trimethylolpropane, tri(meth)acrylate, neopentyl glycol di(meth)acrylate; 1,6-hexanediol di(meth)acrylate; pentaerythritol tri- and tetra(meth)acrylate; 1,3- and 1,4-butanediol di(meth)acrylate. The polyfunctional type of reactive monomer is preferred in regard to improvement of water-resistance, solvent-resistance, abrasion-resistance, blocking-resistance, etc.

If desired, the reactive monomer may comprise a mixture of DCP(M)A with each of the several other types of reactive monomer described hereinabove.

The DCP(M)A copolymers comprise copolymerized therein from about 50% to 95%, preferably about 60 to 90% by weight in the copolymer of at least one other monoethylenically unsaturated monomer having a group of the formula $H_2C\!=\!C\!<$, the balance of the copolymer consisting of DCP(M)A copolymerized therein. The comonomers that can be used include esters of acrylic acid or methacrylic acid with an alcohol having 1–18 carbon atoms, e.g. methyl acrylate or methacrylate which may be generically represented by the expression methyl (meth)acrylate, ethyl (meth)acrylate, propyl (meth)acrylate, isopropyl (meth)acrylate, n-butyl, sec-butyl, isobutyl, or tert-butyl (meth)acrylate, hexyl (meth)acrylate, lauryl (meth)acrylate, stearyl (meth)acrylate; acrylonitrile, methacrylonitrile, styrene, vinyltoluene, vinyl chloride, vinylidene chloride, acrylamide, methacrylamide, acrylic acid, methacrylic acid, vinyl esters of alkanoic acids having 1 to 18 carbon atoms, e.g. vinyl formate, vinyl acetate, vinyl propionate, vinyl butyrate, vinyl pentanoate, and vinyl hexanoate, vinyl laurate, and vinyl stearate. The copolymer may contain two or more of such comonomers, e.g. both methyl methacrylate and ethyl or butyl acrylate, styrene and ethyl or butyl acrylate, or acrylonitrile and ethyl or butyl acrylate.

The proportion of the third essential component of the composition of the present invention may be quite low and is generally used in an amount of 0.0005 to 2% metal content, based on the total weight of DCP(M)A copolymer and reactive monomer. The polyvalent metal-containing complex or salt may be added to the composition prior to storage before use provided such addition is made in the absence of peroxy polymerization initiators and/or free oxygen and provided a volatile oxime stabilizer is included in the composition to form a complex with, and thereby to prevent the oxidizing action of, the metal-containing complex or salt and the composition is placed in closed storage containers to prevent volatilization of the oxime stabilizer during storage.

The molecular weight of the DCP(M)A copolymer may fall within a wide range from about 500 number average to about ten million viscosity average and the copolymer may be made by any convenient method, e.g. oligomers of 500 to 4,000 number average by anionic polymerization; polymers of 4,000 to 200,000 molecular weight by organic solvent solution-polymerization technique; from about 40,000 to ten million by aqueous or non-aqueous emulsion techniques, and these processes may be carried out with chain-transfer agents to attain a desired low molecular weight, if desired. The coating composition may be in an aqueous or non-aqueous system in either of which the copolymer may be dissolved or dispersed in the form of minute particles insoluble in the liquid medium or vehicle.

The fourth essential component of the coating and/or impregnating compositions of the present invention is a volatile oxime, i.e. a volatile ketone-oxime(ketoxime) or aldehyde-oxime (aldoxime) which forms a complex with the metal of the polyvalent metal-containing complex or salt so that on mixing the oxime and the siccative with the composition, the autoxidizing action of the metal compound is prevented by virtue of the complexing action of the oxime. The oxime thus stabilizes the composition for months while stored in closed, i.e. sealed containers or packages. Upon using the stored composition to form coating and/or impregnating films, the oxime evaporates, shifting the equilibrium so that the metal is freed from the oxime-metal complex and exerts rapid autoxidative action on the film-forming components of the composition. The rapidity of setting can be varied by selection of the oxime in respect to its volatility.

In general, oximes of any ketone, having from 3 to 10 carbon atoms, preferably those in which the substituents on the keto-carbon atom are selected from alkyl groups and saturated alicyclic groups, and oximes of any aldehyde, preferably a saturated aliphatic aldehyde, having from 1 to 10 carbon atoms have sufficient volatility to assure rapid autoxidation upon forming coating and/or impregnating films from compositions of the invention. Examples of these oximes are methyl ethyl ketone-oxime, methyl butyl ketone-oxime, 5-methyl-3-heptanone-oxime, cyclohexanone-oxime, and butyraldehyde-oxime. Addition of such a volatile oxime stabilizer assures long stability and pot life of the coating compositions during storage in sealed containers. The amount of oxime stabilizer used may be from about 0.1% to 2% by weight of the total weight of reactive monomer and DCP(M)A copolymer.

The coating composition may also comprise a volatile solvent in an amount of up to about 70% by weight, but preferably not over 60% by weight, of the entire weight of formulated coating composition ready for application.

The coating composition may, if desired, contain a pigment and/or filler, a dispersing agent therefor, and/or other materials conventionally used in paints, varnishes and the like coating compositions.

Besides the essential components mentioned hereinabove, there may also be included various addition or condensation polymers of thermoplastic type, to the extent that they are compatible with the DCP(M)A copolymer, the reactive monomer, and any solvent in the composition. Instead of thermoplastic addition polymers, thermosetting condensates, such as an aminoplast or phenoplast, may be included, again to the extent they are compatible.

Component c) may be any conventionally used polyvalent metal-containing complex or salt that catalyzes the oxidative curing of drying oils or drying oil-modified alkyd resin. These polyvalent metal-containing complexes or salts are known in the drying oil or drying oil-modified alkyd resin art as siccatives or driers. Examples are various polyvalent metal salts including calcium, copper, zinc, manganese, lead, cobalt, iron and zirconium as the cation. Simple inorganic salts are useful such as the halide, chloride, nitrate, sulfate. However, in circumstances where the vehicle is of organic nature such as those of the present invention, it is frequently preferred to use salts of organic acids such as the acetylacetonate, acetate, propionate, butyrate and the like. Complex reaction products of metal oxides, acetates, or borates and vegetable oils are also useful. Generally, the most useful driers are salts of naphthenic acids or of ($C_8$ to $C_{30}$)aliphatic acids. Examples of the polyvalent metal include calcium, copper, zinc, manganese, lead, cobalt, iron, and zirconium. Examples of the aliphatic or fatty acid component or anion of the polyvalent metal-containing salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred complexes or salts are those of cobalt and manganese, such as cobalt octoate, cobalt naphthenate and manganese octoate and naphthenate. Mixtures of various complexes or salts may be used. The polyvalent metal-containing complexes or salts may be a member of the group of driers mentioned in "Encyclopedia of Chemical Technology," Kirk-Othmer, Volume 5, pages 195–205, published by Interscience Encyclopedia, Inc., N.Y. (1950) may be used.

The following examples provide illustrative procedures to make and/or use compositions of the present invention. In these procedures, the parts and percentages are by weight and the temperatures are Centigrade unless otherwise noted.

EXAMPLE A

Preparation of a DCPMA Solution Copolymer with Butyl Acrylate (BA) and Methyl Methacrylate (MMA)

A 500 ml, four-necked, round-bottomed flask is fitted with a mechanical stirrer, a thermometer, a reflux condenser, a nitrogen inlet tube extending below the reaction surface, a heating mantle and an additional funnel. The flask is charged with 40 g of toluene and the solvent is heated to reflux under nitrogen. The monomer mixture consisting of 52 g BA, 8 g MMA, 40 g DCPMA, 50 g toluene, 0.3 g t-butyl peroctoate initiator, and 1 g mercaptoethanol chain transfer agent is added over 2 hr. The chase solution (0.3 g t-butyl peroctoate in 20 g toluene) is added over 0.5 hr.; reflux (110°–114° C) is maintained for 0.5 hr. after completion of this addition. The clear, colorless product is characterized as follows: solids (1 g, 150° C/1 hr.) = 45.5%; intrinsic viscosity = 54 centipoises (LV #1, 60 rpm); $\overline{M}w$ is 45,600 and $\overline{M}n$ is 17,500 by GPC (Gel Permeation Chromatography).

EXAMPLES B–E

Preparation of Additional DCPMA Solution Copolymers

Additional copolymer compositions are prepared following the general procedure of Example A. Their compositions and characterization data are given in Table 1. In Examples B and C, no mercaptoethanol is used.

Table 1

| | Example B | Example C | Example D | Example E |
|---|---|---|---|---|
| BA | 52 | 52 | 52 | 52 |
| MMA | 43 | 38 | 28 | 18 |
| DCPMA | 5 | 10 | 20 | 30 |
| Percent Solids | 47.0 | 46.1 | 46.5 | 46.0 |
| Viscosity, cps | 1300 | 1200 | 52.5 | 115 |
| $\overline{M}w$ | 152,800 | 267,675 | 32,445 | 163,300 |
| $\overline{M}n$ | 37,620 | 41,430 | 5,100 | 29,100 |

EXAMPLE F

Preparation of a Solution Copolymer of Lauryl Methacrylate (LMA) and DCPMA

A 1 liter, three-necked, round-bottom flask fitted with a nitrogen ebullator a reflux condenser, a heating mantle atop a pot-lifter, a "Therm-o-watch" and thermometer and a mechanical stirrer is charged with 90 g of dicyclopentenyl methacrylate, 90 g of lauryl methacrylate, 300 g of xylene and 1.5 g of benzoyl peroxide initiator. Nitrogen sparging is begun and the mixture is heated to 78° C and held for 5¾ hours. The thickened solution is characterized as follows: solids 31.9%, conversion 95.7%. The sample is stripped at reduced pressure to yield final product:

Solids: 37.4%
Viscosity: 640 centipoises
Gel permeation chromatographic

Molecular weights: $\overline{M}w$ = 1,800,000 and $\overline{M}n$ = 56,100
Dicyclopentenyl methacrylate content <0.1%

EXAMPLE G

Preparation of an Anionically Initiated Cooligomer of Butyl Methacrylate (BMA) and DCPMA A 300 ml, three-necked, round-bottomed flask is dried and fitted with two Claisen adapters, an addition funnel, a condenser, a drying tube, a thermometer and Therm-O-watch, and heating mantle atop a pot-lifter. The flask is charged with 2.24 g (0.02 mole, 0.2 mol %) KOtBu powder and 45.7 g of toluene. The suspension is heated to 80° C and a solution, made up of 85.2 g (0.6 mol) of BMA, 87.2 g (0.4 mole) DCPMA, 4.44 g (0.06 mol) n-butanol and 6.0 g (0.04 mol) of dicyclopentenyl alcohol is added over 5 hr. (after addition of half of the solution, glc analysis shows good monomer conversion). After completion of the addition, glc shows substantial monomer remaining and the reaction is recatalyzed with an additional 2.24 g of KOtBu; the reaction mixture then becomes very thick after 2 additional hours of heating at 80° C.

The catalyst is quenched with 2.15 g (43.9 meq) of concentrated sulfuric acid; 140 g of toluene and 1.0 g SuperCel are added, and the solution filtered. The product is concentrated in vacuo to yield a clear amber solution: 82.5% solids (300 mg, 150° C/60 min.). $\overline{M}w$ = 2390 and $\overline{M}n$ = 1280 by GPC.

EXAMPLE H

Preparation of an aqueous Latex Copolymer of Butyl Acrylate (BA), Methyl Methacrylate (MMA), Methacrylic Acid (MAA), and DCPMA.

An emulsion is prepared by addition of 605 parts BA, 332 parts MMA, 50 parts DCPMA and 13 parts MAA to a solution of 60 tert-octylphenoxypoly (40)ethoxyethanol in 1000 parts water. Copolymerization is initiated by addition to the emulsion of 0.12% by weight ammonium persulfate followed by 0.16% by weight sodium hydrosulfite and trace amounts of ferric ion, the weight percents being based on total monomer weight. During polymerization, the batch temperature is maintained just below 62° C. Residual monomer is removed at the end of reaction by addition of 0.12% by weight t-butyl hydroperoxide. After cooling to 50° C, the polymer is neutralized with 13 parts of aqua ammonia (28%), thus producing the ammonium salt of a copolymer of 60.5 BA/33.2 MMA/5 DCPMA/1.3MAA.

EXAMPLE Hc

Latex Copolymer of 55.5 BA/43.2 MMA/1.3 MAA
The procedure of Example H is repeated omitting the DCPMA, reducing the BA to 555 parts and increasing the MMA to 432 parts.

EXAMPLE I

Preparation of a Water-Soluble Copolymer of BA, MAA, and DCPMA.

A solution of 700 parts BA, 150 parts DCPMA, and 150 parts MAA and a mixture of 3% by weight t-butyl perbenzoate in 50 parts 2-butoxyethanol are added uniformly over 4 hours to 370 parts of 2-butoxyethanol at 155° C. After cooling to 100° C., the polymer product is neutralized with a solution of 106 parts aqua ammonia (28%) in 480 parts water, thus producing an aqueous solution of the ammonium salt of a copolymer of 70 BA/15 DCPMA/15 MAA.

EXAMPLE J

A Water-Soluble Ammonium Salt of a Copolymer of 60 BA/25 DCPMA/15 MAA.

The procedure described in Example I above is repeated except the amounts of BA and DCPMA are changed to 600 parts BA and 250 parts DCPMA.

EXAMPLES 1-7

Evaluation of Coating Compositions

To one sample of each of the materials of Examples A–G is added 0.06 percent of cobalt (II) metal as the naphthenate and 0.25 percent methyl ethyl ketoneoxime based on solids content. Dicyclopentenyl methacrylate (DCPMA) is added to a second sample of each material in the ratio of 1 part to 3 parts of polymer solids, followed by addition of cobalt and oxime in the amounts noted above. The compositions are filmed on steel test panels to yield 2 mil films when dry. The coating properties are given in Table 2 wherein W indicates the sample containing DCPMA and WO refers to the sample without it.

Use of the non-volatile reactive monomer diluent generally results in improved coating hardness and marked increase in resistance to solvent attack.

Table 2

| Example: | 1 | | 2 | | 3 | | 4 | |
|---|---|---|---|---|---|---|---|---|
| (Polymer of Example) | A | | B | | C | | D | |
| Coating Properties: | W | WO | W | WO | W | WO | W | WO |
| Tukon Hardness (KHN) | | | | | | | | |
| 1 week | 5.4 | — | 1.3 | 0.5 | 2.3 | 0.6 | 2.5 | 0.4 |
| 2 weeks | 7.4 | 1.4 | 4.4 | 0.4 | 2.6 | 0.6 | 3.6 | 0.4 |
| Pencil Hardness | | | | | | | | |
| 2 weeks | F | F | F | F | F | B | B | 4B |
| Soluble Fraction[1] | | | | | | | | |
| 1 week | — | 1.00 | 0.91 | 0.94 | 0.23 | 0.96 | 0.45 | 0.98 |
| 2 weeks | 0.13 | 0.85 | 0.22 | 0.86 | 0.22 | 0.94 | 0.32 | 0.94 |
| Example: | 5 | | 6 | | 7 | | | |
| (Polymer of Example) | E | | F | | G | | | |
| Coating Properties: | W | WO | W | WO | W | WO | | |
| Tukon Hardness (KHN) | | | | | | | | |
| 1 week | 5.3 | 0.5 | 7.7 | 4.1 | 17.0 | 1.0 | | |
| 2 weeks | 6.0 | 1.0 | 9.3 | 5.3 | 16.1 | 3.9 | | |
| Pencil Hardness | | | | | | | | |
| 2 weeks | H | F | F | B | F | 4B | | |
| Soluble Fraction[1] | | | | | | | | |
| 1 week | 0.17 | 0.96 | — | — | 0.75 | 1.00 | | |

Table 2-continued

| 2 weeks | 0.14 | 0.60 | 0.13 | 0.10 | 0.76 | 0.96 |

[1]A tared portion of film is extracted with toluene, the residue is dried at 350° F for 1 hour and weighed.

EXAMPLE 8

Coating Compositions with Various Non-Volatile Reactive Monomers and Monomer Mixtures The copolymer solution of Example E is blended in various proportions with different polymerizable monomer diluents. To each sample is added 0.06 percent cobalt (II) as the naphthenate and 0.25 percent methyl ethyl ketone oxime based on the combined weight of polymer solids and reactive monomer. The coatings are cast on steel test panels to yield 0.2-mil thick films when dry. The coating properties observed are given in Table 3. All of the non-volatile reactive monomers improve both hardness development and solvent resistance of the coating.

TABLE 3

| Coating | Composition (solids) | | Total Solids (in toluene) | Tukon Hardness | | Toluene-Soluble Fraction | |
|---|---|---|---|---|---|---|---|
| | Ex. E | Reactive Monomer[1] | | 1 week | 2 weeks | 1 week | 2 weeks |
| A | 100 | None | 46.0 | 0.4 | 1.4 | 1.00 | 0.41 |
| B | 60 | 40 DCPMA | 58.1 | 8.1 | 9.0 | 0.33 | 0.28 |
| C | 60 | 40 DCPA | 58.1 | 5.6 | 9.0 | — | 0.18 |
| D | 70 | 25 DCPMA 5 CEMA | 54.3 | 6.8 | 7.5 | 0.45 | 0.37 |
| E | 60 | 20 DCPMA 20 TMPTMA | 58.1 | 4.9 | 6.8 | 0.24 | 0.20 |
| F | 80 | 10 DCPA 10 TMPTMA | 51.0 | 3.6 | 6.6 | 0.16 | 0.13 |
| G | 60 | 30 DCPMA 10 BDDMA | 58.1 | 6.2 | 7.3 | 0.20 | 0.19 |
| H | 80 | 10 DCPMA 10 BDDMA | 51.0 | 3.2 | 5.7 | — | 0.19 |
| I | 70 | 20 DCPMA 10 DA | 54.3 | 3.7 | 4.5 | 0.25 | 0.22 |

[1]DCPMA = dicyclopentenyl methacrylate
DCPA = dicyclopentenyl acrylate
TMPTMA = trimethylolpropane trimethacrylate
BDDMA = 1,3-butanediol dimethacrylate
DA = n-decyl acrylate
CEMA = cetyl methacrylate, a crude mixture of:
    $<C_{16}$ (side chain) 2%
    $C_{16}$ 51%
    $C_{18}$ 31%
    $C_{20}$ 12%
    $>C_{20}$ 1%

EXAMPLES 9-18

Evaluation of Aqueous Latex Coating Compositions.

Separate portions of the aqueous latex polymers of Examples H and Hc are thoroughly mixed with or without a polymerizable monomer as indicated in Table 4, 0.20 percent cobalt drier (as the acetate), and 0.25 percent methyl ethyl ketone-oxime stabilizer (percentages based on total solids) as specified in Table 4: the formulations are cast on steel test panels to yield 1.5 mil films when dry, and after two weeks curing yield the coating properties given therein. A capital X indicates what is added, if there is an addition.

Table 4

| Example No. | 9 | 10 | 11 | 12 | 13 | 14 | 15 | 16 | 17 | 18 |
|---|---|---|---|---|---|---|---|---|---|---|
| (Polymer of Example) | | | Hc | | | | | H | | |
| Additive | | | | | | | | | | |
| None | X | | | | X | | | | | |
| Co+Ox | | X | | | | X | | | | |
| DCPMA (25%), Co+Ox | | | X | | | | X | | | |
| DCPMA (50%), Co+Ox | | | | X | | | | X | | |
| 15% DCPMA, | | | | | | | | | | |

Table 4-continued

| Example No. | 9 | 10 | 11 | 12 | 13 | 14 | 15 | 16 | 17 | 18 |
|---|---|---|---|---|---|---|---|---|---|---|
| (Polymer of Example) | | | Hc | | | | | H | | |
| 15% BDDMA, Co+Ox | | | | | | | | | | |
| Film Properties | | | | | | | | | | |
| Hardness | | | | | | | | | | |
| KHN | 0.6 | 0.4 | 1.0 | 0.8 | 0.3 | — | 0.3 | 0.3 | 2.1 | 0.3 |
| Pencil | B | B | 2B | 2B | 5B | 4B | 4B | B | 3B | 5B |
| Print Resistance* (140° F/2psi/1 hr.) | S | S | S | S | S | S | H | H | L | M |

*Scale:
L = Light
M = Moderate
H = Heavy
S = Severe

EXAMPLES 19-28

Evaluation of Aqueous Solution Coating Compositions.

The water-soluble polymers of Examples I and J are thoroughly mixed with or without a polymerizable monomer as indicated by a capital X in Table 5, 0.20 percent cobalt drier (as the acetate), and 0.25 percent methyl ethyl ketone oxime stabilizer (percentages based on total solids) as specified in Table 5; the formulations are cast on steel test panels to yield 1.5 mil films when dry, and after two weeks curing yield the coating properties given therein.

Table 5

| Example No. | 19 | 20 | 21 | 22 | 23 | 24 | 25 | 26 | 27 | 28 |
|---|---|---|---|---|---|---|---|---|---|---|
| (Polymer of Example) | | | I | | | | | J | | |
| Additive | | | | | | | | | | |
| None | X | | | | X | | | | | |
| Co+ox | | X | | | | X | | | | |
| DCPMA (25%) (Co+ox) | | | X | | | | X | | | |
| DCPMA (50%) (Co+ox) | | | | X | | | | X | | |
| 15% DCPMA, | | | | | X | | | | | X |

Table 5-continued

| Example No. | 19 | 20 | 21 | 22 | 23 | 24 | 25 | 26 | 27 | 28 |
|---|---|---|---|---|---|---|---|---|---|---|
| (Polymer of Example) | | | I | | | | | J | | |
| 15% BDDMA, (Co+ox) | | | | | | | | | | |
| Properties of Film | | | | | | | | | | |
| Knoop Hardness No. | 0.6 | 0.6 | 0.6 | 0.7 | 0.6 | 0.6 | 0.5 | 2.2 | 7.0 | 0.7 |
| Pencil Hardness | | Less Than 6B | | | | 4B | 4B | 4B | 4B | 4B |
| Print Resistance (140° F/2PSI/1 hr.) | S | S | S | S | S | S | S | H | M | S |

EXAMPLES 29-35

Results similar to those tabulated for examples 1-7 respectively are obtained when the latter examples are repeated using copolymers made as in examples A-G, respectively except for the substitution in the same weight proportion of DCPA for the DCPMA.

What is claimed is:

1. An autoxidizable coating or impregnating composition comprising:
   (a) a copolymer of about 5% to about 50% by weight of at least one of dicyclopentenyl acrylate or dicyclopentenyl methacrylate and about 95% to about 50% by weight respectively of at least one other monoethylenically unsaturated monomer,
   (b) a non-volatile reactive monomer, at least 50 weight percent of which is at least one of dicyclopentenyl acrylate or dicyclopentenyl methacrylate,
   (c) an effective amount of a polyvalent metal-containing complex or salt that catalyzes the oxidative curing of a) and b), and
   (d) a small but effective amount of a volatile oxime stabilizer.

2. A composition according to claim 1 wherein the polyvalent metal-containing complex or salt is used in an amount of 0.0005% to 2% of metal, based on the total weight of a) and b).

3. A composition according to claim 1 wherein the copolymer is a copolymer of 10 to 40% by weight of at least one of dicyclopentenyl acrylate or dicyclopentenyl methacrylate and 90 to 60% respectively of at least one other monoethylenically unsaturated monomer having a single group of the formula $H_2C=C<$.

4. A composition according to claim 1 wherein the reactive monomer consists essentially of at least one of dicyclopentenyl acrylate or dicyclopentenyl methacrylate.

5. A composition according to claim 1 wherein the reactive monomer comprises a $(C_{10}-C_{20})$alkyl or $(C_{10}-C_{20})$alkenyl acrylate or methacrylate and/or a di$(C_4-C_{20})$alkyl fumarate, maleate, or itaconate.

6. A composition according to claim 1 wherein the reactive monomer b) comprises a polyol polyacrylate or polymethacrylate.

7. A composition according to claim 3 wherein the polyvalent metal-containing complex or salt is used in an amount of 0.0005% to 2% of metal, based on the total weight of a) and b), and the proportion of the volatile oxime stabilizer is from 0.1 to 2% by weight, based on the total weight of a) and b).

8. A composition according to claim 7 wherein the polyvalent metal-containing complex or salt is a cobalt (II) complex or salt.

9. A composition according to claim 7 wherein the polyvalent metal-containing complex or salt is a cobalt naphthenate or a cobalt $(C_8-C_{18})$-alkanoate.

10. A composition according to claim 1 wherein the copolymer a) is dispersed or dissolved in an aqueous or non-aqueous organic liquid medium.

11. An air-dried cured film product of a composition of claim 1.

12. An air-dried cured film product of a composition of claim 8.

* * * * *

UNITED STATES PATENT OFFICE
CERTIFICATE OF CORRECTION

Patent No. 4,100,133    Dated July 11, 1978

Inventor(s) William D. Emmons et al.

It is certified that error appears in the above-identified patent and that said Letters Patent are hereby corrected as shown below:

In column 9, lines 61-2, Table 4, "9 10 $\underline{11}\atop{\overline{HC}}$ 12 13 14 15 $\underline{16}\atop{\overline{H}}$ 17 18"

should be -- 9 10 $\underline{11}\atop{\overline{HC}}$ 12 13   14 15 $\underline{16}\atop{\overline{H}}$ 17 18 --.

In column 10, lines 8-9 "9 10 $\underline{11}\atop{\overline{HC}}$ 12 13 14 15 $\underline{16}\atop{\overline{H}}$ 17 18"

should be -- 9 10 $\underline{11}\atop{\overline{HC}}$ 12 13   14 15 $\underline{16}\atop{\overline{H}}$ 17 18 --.

UNITED STATES PATENT OFFICE
CERTIFICATE OF CORRECTION

Patent No. 4,100,133  Dated July 11, 1978

Inventor(s) William D. Emmons et al.

It is certified that error appears in the above-identified patent and that said Letters Patent are hereby corrected as shown below:

In column 11, line 8, shown between correct lines 8 and 9, Table 5 - continued,

```
"  Knoop Hardness No.  0.6  0.6  0.6  0.7  0.6    0.6  0.5  2.2  7.0  0.7
   Pencil Hardness       Less than 6B                4B   4B   4B   4B   4B
   Print Resistance    S    S    S    S    S       S    S    S    S    S  "
``` should be

```
-- Knoop Hardness No.  0.6  0.6  0.6  0.7  0.6    0.6  0.5  2.2  7.0  0.7
   Pencil Hardness     --  Less than 6B  --         4B   4B   4B   4B   4B
   Print Resistance    S    S    S    S    S       S    S    H    M    S  --
```

Signed and Sealed this

Thirteenth Day of February 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,100,133
DATED : July 11, 1978
INVENTOR(S) : William D. Emmons

It is certified that error appears in the above—identified patent and that said Letters Patent is hereby corrected as shown below:

The term of this patent subsequent to January 31, 1995, has been disclaimed.

Signed and Sealed this

Nineteenth Day of January 1982

[SEAL]

Attest:

Attesting Officer

GERALD J. MOSSINGHOFF
Commissioner of Patents and Trademarks